APPARATUS FOR MEASURING OR RECORDING OSCILLATIONS, IMPULSES, AND THE LIKE.
APPLICATION FILED APR. 24, 1915.
1,203,172.
Patented Oct. 31, 1916.
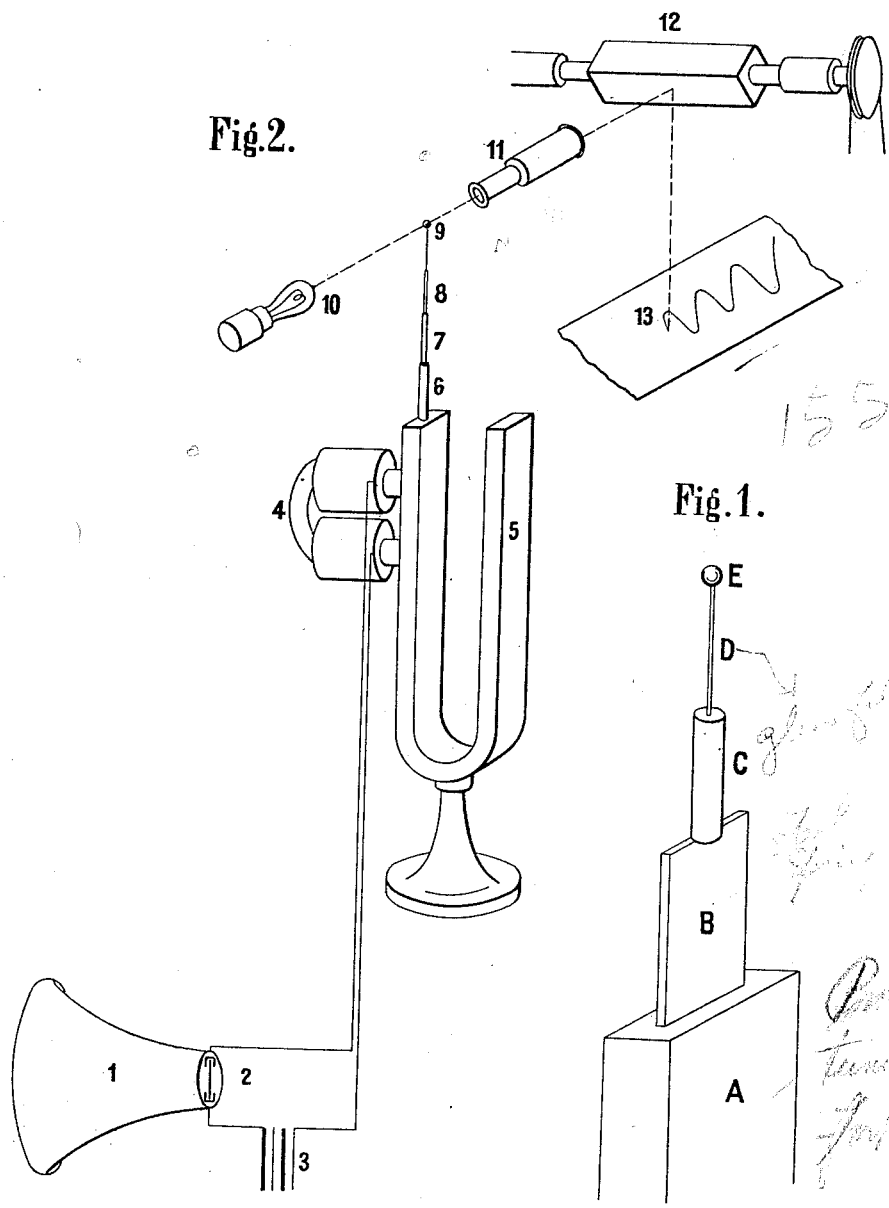
Witnesses:
Chas. E. Whiteman
H. D. Penney
Inventor:
Alexander Behm,
By his Atty F. H. Richards

UNITED STATES PATENT OFFICE.

ALEXANDER BEHM, OF KIEL, GERMANY.

APPARATUS FOR MEASURING OR RECORDING OSCILLATIONS, IMPULSES, AND THE LIKE.

1,203,172. Specification of Letters Patent. Patented Oct. 31, 1916.

Application filed April 24, 1915. Serial No. 23,732.

*To all whom it may concern:*

Be it known that I, ALEXANDER BEHM, a subject of the Emperor of Germany, residing at Hardenbergstrasse 31, Kiel, Germany, have invented certain new and useful Improvements in Apparatus for Measuring or Recording Oscillations, Impulses, and the like, of which the following is a specification.

This invention relates to an apparatus for recording and measuring mechanical, acoustic, or electro-magnetic oscillations or impulses.

Hitherto an oscillating or vibrating body, such as for instance a tuning fork or a rod, has been used for measuring oscillations and the like. According to this invention, a series of members preferably rod or bar shaped, are used, connected together in order of diminishing weight, the heaviest member being attached to the body whose vibrations are to be used. The lightest member, which will be the most remote from the vibrating body, may be utilized as an indicator part.

In the apparatus according to the invention, the final oscillation or deflection becomes *cæteris paribus*, greater than could ever be attained with a single member. Moreover a great damping can be obtained, as owing to greater visibility of the phenomenon, the tuning need be less sharp, the measuring member being coupled to the tuning fork or other vibrating device used with the apparatus by the intermediate member or members in a looser manner than hitherto. By suitably calculating the dimensions and the ratios of oscillation of the separate members of the combination, it is possible for instance to insure that the measuring member would come to rest again within a period of 1/50 sec. in spite of having made a large deflection. This strong damping is brought about not only by the increased air resistance due to the greater length of surface, but chiefly by the vibrations which the separate members perform relatively to each other. Further, as is well known, oscillating bodies start resonance vibrations not only when they receive impulses corresponding to fundamental vibration, but they respond also to harmonics thereof. This phenomenon cannot be observed in the older arrangements, as tuning forks generally respond only to fundamental vibrations. In the apparatus according to the invention, on the contrary, it is possible to insure, by suitable tuning, that one or more of the different members will respond in a more energetic manner to harmonics so that both the fundamental vibration and the harmonics can be clearly recognized in the curve produced.

The invention is described with reference to the accompanying drawings, in which—

Figure 1 shows diagrammatically a construction of the apparatus itself; and Fig. 2 illustrates a method of using the apparatus.

In Fig. 1, A is a steel bar, for instance a prong of a tuning fork, B is a steel spring, C a glass filament of, say, 0.2 mm. diameter, D is a glass filament of, say, 0.05 mm. diameter, which carries at its end, at E, a small ball. When the single constituent parts A, B, C, D, E are properly tuned relatively to each other, a vibration of the glass ball E, will be obtained which is considerably greater than the vibration of the bar A.

In the construction described, it has been assumed that the members C and D are of cylindrical type. These members as well as the part E may, however, with advantage be in the form of flat blades, and the single member could then be placed on each other flat or cross-wise. It is further possible to make the members of one piece of material suitably shaped so that the various members are differentiated from each other. Finally the members with the exception of the ball E, may consist entirely of fine cylindrical or flattened glass tube.

For measuring vibrations, the indicator device could be mounted either on a tuning fork, with or without a resonator, or on a diaphragm, with or without a resonator, or finally on a spring blade or on an oscillating rod. The tuning fork of the diaphragm or the spring blade could then be set in vibration either directly by an impinging sound or impulse, or indirectly, by means of a microphone which takes up the sound or impulse, and sets the tuning fork, diaphragm or spring blade into vibrations by means of an electromagnet.

In Fig. 2, 1 is a sound horn which transmits the arriving sound or impulse wave to a microphone 2, which correspondingly controls the energizing of an electromagnet 4 by means of a source of current 3. In front of the poles of the said magnet vibrates the tuning fork 5 carrying the many times tuned glass threads 6, 7, 8, and at the upper end the glass ball 9. The glass ball 9 gives a dot-like image of a source of light 10, which image is recorded in the form of a curve on a sheet 13 sensitive to light, by means of a microscope 11 and a rotating mirror 12.

In addition to sound and similar waves, mechanical or electro-magnetic waves can also be recorded. In the latter case, the instrument could be used in place of the torsion galvanometer or of the oscillograph, provided that it is properly tuned.

What I claim is:—

1. In vibrating measuring apparatus, a vibrating body, and a series of vibrating members of different degrees of vibration joined to each other in order of degree of vibration, the member having the least degree of vibration being attached to the vibrating body.

2. In vibration measuring apparatus, a vibrating body, and a series of vibrating members of different degrees of vibration joined to each other in order of degree of vibration, the member having the least degree of vibration being attached to the vibrating body, and the extreme member forming an indicator.

3. In a vibration measuring apparatus, a vibrating body, a series of bar-shaped members of different degrees joined to each other in order of degree of vibration, the member of least vibration being attached to the vibrating body, and a ball at the end of the member of greatest vibration.

4. In a vibration measuring apparatus, a vibrating body having attached thereto a rod which is reduced in a series of steps toward the free end of the rod, each reduced part being of smaller mass than the next part nearer the vibrating body.

5. In a vibration measuring apparatus, a tuning fork, a steel blade projecting upward from an arm thereof, a glass filament of smaller mass than the steel blade projecting upward therefrom, a second glass filament of smaller mass than the first projecting upward from the said first filament, and a small ball on the free end of the second filament.

6. In vibration measuring apparatus, a vibrating body, a series of vibrating members of different degrees of vibration joined to each other in order of degree of vibration, the member of least vibration being attached to the vibrating body, and means for transmitting vibrations to the vibrating body.

7. In vibration measuring apparatus, a vibrating body, a series of vibrating members of different degrees of vibration joined to each other in order of degree of vibration, the member of least vibration being attached to the vibrating body and the extreme member forming an indicator, means for transmitting vibrations to the vibrating body, and means for producing a visual record of the displacements of the indicator.

In witness whereof I have hereunto signed my name this 3rd day of April 1915, in the presence of two subscribing witnesses.

ALEXANDER BEHM.

Witnesses:
 JULIUS RÖPKE,
 PAUL POPPENDUCK.

Copies of this patent may be obtained for five cents each, by addressing the "Commissioner of Patents, Washington, D. C."